No. 677,902. Patented July 9, 1901.
W. O. STODDARD, Jr.
APPARATUS FOR DESICCATING EGGS.
(Application filed Nov. 8, 1899.)
(No Model.)
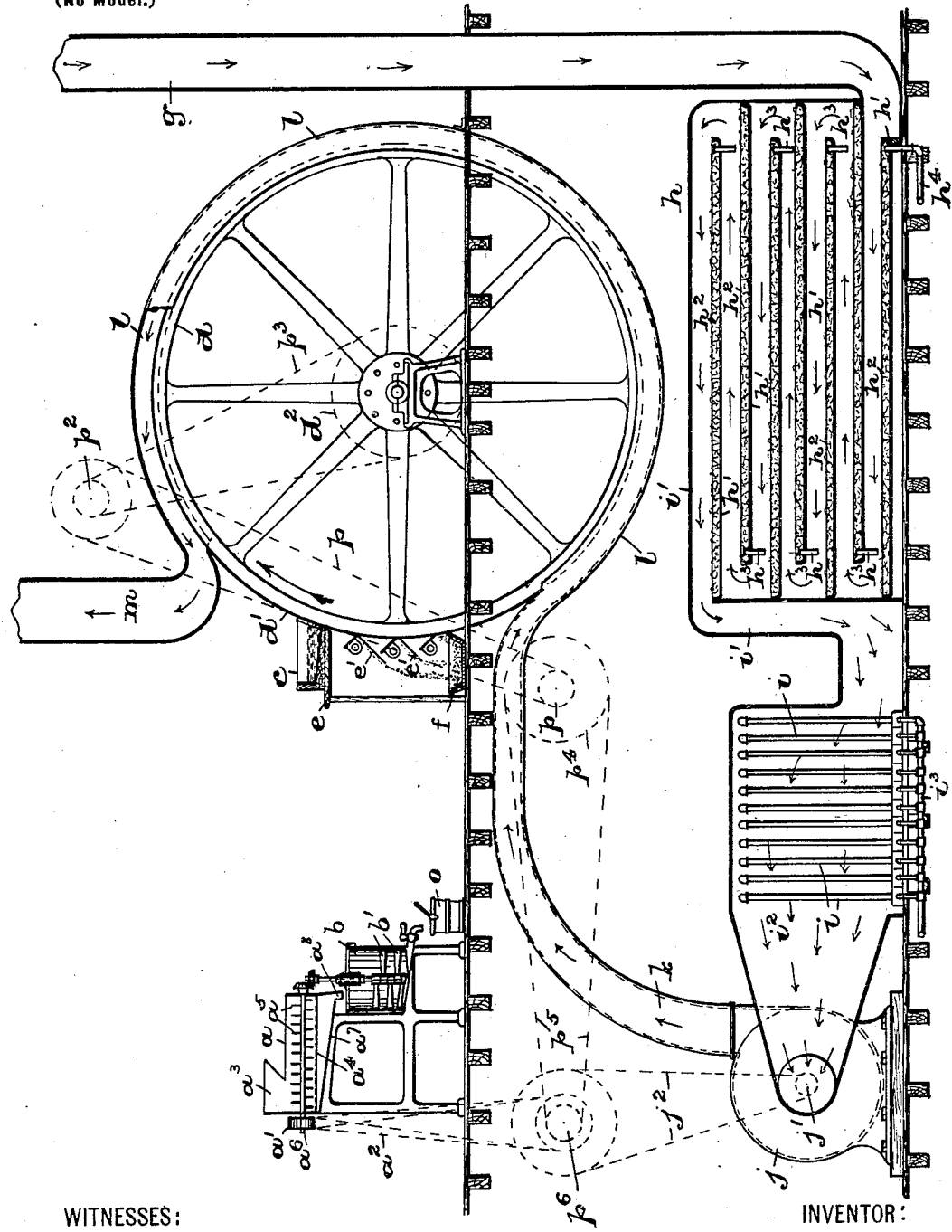
WITNESSES: INVENTOR:
WILLIAM O. STODDARD, Jr.
BY
ATTORNEY.
THE NORRIS PETERS CO., PHOTO-LITHO., WASHINGTON, D. C.

UNITED STATES PATENT OFFICE.

WILLIAM O. STODDARD, JR., OF MADISON, NEW JERSEY, ASSIGNOR TO THE PURE FOOD COMPANY, OF NEW JERSEY.

APPARATUS FOR DESICCATING EGGS.

SPECIFICATION forming part of Letters Patent No. 677,902, dated July 9, 1901.

Application filed November 8, 1899. Serial No. 736,246. (No model.)

*To all whom it may concern:*

Be it known that I, WILLIAM O. STODDARD, Jr., a citizen of the United States, residing at Madison, in the county of Morris and State of New Jersey, have invented certain new and useful Improvements in Plants for Desiccating Eggs; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.
This invention has reference to a novel plant for the desiccating of eggs and other substances with a view to the prevention of the action of the causes of deterioration and decomposition of the egg-matter or the like.
My invention therefore has for its primary object a novel arrangement and combination of desiccating apparatus, extracting device for extracting the moisture from the ordinary air used in the process of desiccating the eggs and other substances, an air-drier, and air-forcing apparatus or blower, all combined to produce a novel plant in which egg-matter or the like is treated to successfully deprive such viscid or glutinous material as the batter of eggs made by beating together the yolks and whites of eggs or the whites of eggs or the yolks of eggs or other similar material of its watery particles and reduce the same to a fine powder or meal, ready for use, at a low cost of manufacture and in the best form of preservation and transportation.

It is well known that solubility of desiccated egg is lost unless the product is substantially unchanged from its normal conditions in the shell. Successful desiccation must therefore be performed prior to any first change of the egg-matter in the shell, and when the egg-batter is treated for desiccation several conditions of the atmosphere as to moisture or dryness, purity or impurity, must be observed to produce a good and healthful quality of the product.

One of the main purposes of my invention is to treat the egg-batter or other like material on a revolving drum to a blast of air which is perfectly pure and free from the moisture found in humid air with a view of providing a novel plant comprising all the apparatus and devices to be hereinafter fully set forth and which go to make up the novel features of my present invention.

The arrangement of the apparatus and devices to be hereinafter described is very simple and must be arranged to fully purify and thoroughly dry the air to be forced around a revolving drum, upon the surface of which the egg-batter or other like material to be desiccated is delivered to be dried thereon and finally scraped off as the finished and useful product ready for its various uses or to be stored away for future purposes without deterioration.

The plant hereinafter more fully described permits the desiccation of the yolks or the whites of eggs separately or together without change of the natural quality or composition of the egg-matter and produces a product of a uniform, soluble, and flaky character.

It is a well-known fact that the conditions of the atmosphere as to humidity varying from day to day affect the egg product as to quantity and quality, and for this reason it becomes necessary to construct the novel desiccating plant forming the gist of this invention.

The invention is clearly illustrated in the accompanying drawing, in which I have illustrated the most complete arrangement of the apparatus and devices comprising my novel plant for the desiccation of eggs or the like.

In said drawing, *a* indicates an egg-breaker, and *b* a mixer of any suitable construction, the mixer *b* being connected with said breaker *a* substantially in the manner illustrated.

The coating-tray is indicated by the reference-letter *c* and is arranged upon a support *e*, provided with a suitable arrangement of scraper or scrapers *e'* against the surface *d'* of a large drum or wheel *d*. Arranged beneath said scraper or scrapers *e'* is a flake or product receiving tray *f*. An air inlet or duct *g* is arranged to take in air from the top or outside of the building in which the plant is placed.

*h* indicates an air drying and purifying device; *i*, a steam-coil or other suitable heater;

$i'$, an air-duct from said drier $h$ to the heater $i$, and $i^2$ is an outlet from the heater, which communicates with a blower $j$. The said blower is provided with a wind-pipe $k$, which communicates with a suitably-constructed wind-box $l$, inclosing a portion of the cylindrical surface $d'$ of said drum $d$, and $m$ is the final outlet or exhaust for the air saturated with the moisture extracted from the egg-batter or other matter on the surface of the rotating drum.

As shown, the air drying and purifying apparatus $h$ is preferably provided with an arrangement of trays $h'$, filled with layers $h^2$ of a moisture and impurity absorbing material—as calcium chlorid, sulfuric acid, or other absorbing material—and $h^3$ and $h^4$ are suitable drain-pipes leading from said apparatus $h$.

The drain-pipes of the steam-coil $i$ are indicated by the reference-letter $i^3$.

The driving-gear is indicated in dotted outline, the arrangement herein shown being the one which I prefer; but said driving-gear may be differently arranged, as will be clearly evident. It consists, essentially, of a main driving-shaft $p$, belt $p'$, counter-shaft $p^2$, and belt $p^3$ for operating the driving-pulley $d^2$ of the drum or wheel $d$. On said shaft $p$ is a pulley $p^4$ and belt $p^5$ for driving a second counter-shaft $p^6$, and $a'$ and $j'$ are a pair of pulleys for belts $a^2$ and $j^2$, respectively operating the egg-breaker $a$ and blower $j$.

The egg-batter may be extracted from the mixer $b$ into a pail $o$ for carrying it to the coating-tray $c$; but any other suitable conveying means may be employed for taking the egg-batter from the mixer to said tray.

Having now described the general arrangement of the apparatus and devices comprising my novel plant for desiccating eggs, I will describe the operation of the same for depriving the viscid or glutinous egg material of its water particles and leaving the solid part thereof in a condensed form suitable for future use, preservation, transportation, and storing purposes.

In order to combine the largest drying-surface on which a thin film of egg-batter or the like is spread for desiccation and force a blast of dry and pure air over such film and to produce a most economical desiccating plant, the several apparatus and devices are arranged as follows: The eggs in the desired quantities are thrown into the hopper $a^3$ of the breaker upon a sieve-like partition $a^4$ and broken open by the arms or wings $a^5$ of a shaft $a^6$, operated from the pulley $a'$ and belt $a^2$, hereinabove mentioned. The egg material then passes through said sieve-like partition $a^4$ upon an inclined bottom $a^7$ and through an outlet $a^8$ into a suitable mixer $b$, which may be of any approved design, where the material is agitated by the stirrers or blades $b'$ into the form of a batter, to be drawn off into a pail $o$ for pouring it into a suitable coating-tray $c$, hereinabove mentioned. The said tray $c$ is open on one side and when resting upon the support $e$ can be forced into close contact with the slowly-revolving surface $d'$ of the drum or wheel $d$, said surface $d'$ thereby practically forming the fourth side of the tray $c$ to retain the egg-batter in said tray, but allowing the said slowly-moving surface $d'$ to carry up a thin coating of the egg-batter, and thereby covering the entire surface of the drum or wheel $d$ with this viscid or glutinous material. This drum or wheel is caused to revolve slowly in the direction of the arrow, and the thin coating of egg-batter or other material to be desiccated is thoroughly dried by passing through the wind-box $l$ in direct contact with a continuous supply of fresh, dry, and pure air blowing in the opposite direction to the movement of the drum or wheel $d$. The egg-batter or other material having thus passed from the point of its application in a moist and viscid condition onto the surface $d'$ of the drum or wheel $d$ thus becomes fully dried (with all moisture particles removed and forced from the wind-box $l$ into the outlet $m$) to the point of contact with suitably-arranged and suitably-constructed scrapers $e'$, the said scrapers being forced against the face of the drum or wheel and the dried egg-matter is scraped off and falls in the form of flakes into the receiving or flake tray $f$, from which the material is removed and placed in packages for storage and further use.

In order that the operation of desiccation may be successful to produce a perfect product, it is absolutely essential that the air should be perfectly dry or as nearly so as possible, and, furthermore, all impurities should be removed from the air. The apparatus is used to supply this air from some point, preferably above the roofs of surrounding buildings, the air being drawn into the pipe $g$ and the moisture and any impurities therein extracted by means of the air drying and purifying apparatus $h$, through which the air passes in the direction of the arrows over suitable trays $h'$, filled with calcium chlorid or other suitable absorbent—such, for instance, as sulfuric acid—or the apparatus $h$ may be made in the manner of a refrigerating apparatus for cooling the air down to freezing. After the air has thus been thoroughly dried and purified it is drawn through the heater $i$, hereinabove mentioned, whereby the air becomes heated to the proper degree which by actual experiments has been found most effective for the proper desiccation of the egg or other material. The blower $j$ next forces this heated air into the wind-pipe $k$ and into the box $l$ around the drum $d$ in the direction of the arrows in direct contact with the oppositely-moving egg-batter upon the surface $d'$ of the drum, as previously stated, from which all moisture is extracted and forced with the wind from the wind-box $l$ into the outlet $m$, the egg material becoming dried upon the surface $d'$ and finally scraped off in its finished condition as a salable article for the market.

I am fully aware that several changes may be made in the various details of the construction of each separate apparatus without departing from the scope of my present invention. Hence I do not limit my invention to the precise details of the construction of each apparatus as herein shown and described.

Having thus described my invention, what I claim is—

1. In a plant for the desiccation of eggs or other substances, the combination, with a drum or wheel and means for revolving the same, of a coating-tray constructed with one side open and in contact with the surface of said drum or wheel, a wind-box inclosing a portion of the drying-surface of said drum or wheel, having an outlet and an inlet, a blower connected with said air-inlet to said wind-box, a heater over which air is drawn by said blower and forced into said wind-box, and means arranged beneath said coating-tray and in contact with the drying-surface of said drum or wheel, for removing the dried and desiccated material, substantially as and for the purposes set forth.

2. In a plant for the desiccation of eggs or other substances, the combination, with a drum or wheel and means for revolving the same, of a coating-tray constructed with one side open and in contact with the surface of said drum or wheel, a wind-box inclosing a portion of the drying-surface of said drum or wheel, having an outlet and an inlet, a blower connected with said air-inlet to said wind-box, a heater over which air is drawn by said blower and forced into said wind-box, and a scraping device arranged beneath said coating-tray and in contact with the drying-surface of said drum or wheel, for removing the dried and desiccated material, substantially as and for the purposes set forth.

3. In a plant for the desiccation of eggs or other substances, the combination, with a drum or wheel, and means for revolving the same, of a coating-tray constructed with one side open and in contact with the surface of said drum or wheel, a wind-box inclosing a portion of the drying-surface of said drum or wheel, having an outlet and an inlet, a blower connected with said air-inlet to said wind-box, an air drier and purifier, a heater, a means of communication between said air drier and purifier, heater and blower for drawing air into said drier and purifier and through said heater, and forcing it into said wind-box, and means arranged beneath said coating-tray and in contact with the drying-surface of said drum or wheel, for removing the dried and desiccated material, substantially as and for the purposes set forth.

4. In a plant for the desiccation of eggs or other substances, the combination, with a drum or wheel, and means for revolving the same, of a coating-tray constructed with one side open and in contact with the surface of said drum or wheel, a wind-box inclosing a portion of the drying-surface of said drum or wheel, having an outlet and an inlet, a blower connected with said air-inlet to said wind-box, an air drier and purifier, a heater, a means of communication between said air drier and purifier, heater and blower for drawing air into said drier and purifier and through said heater, and forcing it into said wind-box, and a scraping device arranged beneath said coating-tray and in contact with the drying-surface of said drum or wheel, for removing the dried and desiccated material, substantially as and for the purposes set forth.

5. In a plant for the desiccation of eggs or other substances, the combination, with a drum or wheel, means for revolving the same, and means for coating said drum with the material to be desiccated, of a wind-box inclosing a portion of said drum or wheel, a blower connected with said wind-box, an air drier and purifier, and a means of communication between said drier and purifier and said blower for drawing air through said drier and purifier and forcing it into said wind-box, substantially as and for the purposes set forth.

6. In a plant for the desiccation of eggs or other substances, the combination, with a drum or wheel, means for revolving the same, and means for coating said drum with the material to be desiccated, of a wind-box inclosing a portion of said drum or wheel, a blower connected with said wind-box, an air drier and purifier, a heater, a means of communication between said drier and purifier, heater and blower for drawing air through the same, and forcing it into said wind-box, substantially as and for the purposes set forth.

In testimony that I claim the invention set forth above I have hereunto set my hand this 30th day of October, 1899.

WILLIAM O. STODDARD, JR.

Witnesses:
FREDK. C. FRAENTZEL,
HARRY MARTIN.